United States Patent Office 3,726,822
Patented Apr. 10, 1973

3,726,822
MODIFIED ANIONIC PAPER-SIZING AGENTS
Wulf von Bonin, Hans Ludwig Honig, and Werner Theuer, Leverkusen, Germany, assignors to Bayer Aktiengesellschaft
No Drawing. Filed July 7, 1971, Ser. No. 160,516
Claims priority, application Germany, July 10, 1970, P 20 34 263.6
Int. Cl. C08f 41/12, 37/18
U.S. Cl. 260—29.6 RW      4 Claims

ABSTRACT OF THE DISCLOSURE

Anionic paper-sizing agents based on mixtures of (A) water-soluble salts of copolymers from olefinically unsaturated monomers such as ethylene, styrene, isobutylene or indene and maleic or itaconic acid imide and (B) a latex of a copolymer of olefinically unsaturated monomers such as an aromatic vinyl compound, vinyl ester, ether, halide or amide, (meth)acrylic ester or a nitrile, ester or amide.

---

This invention relates to anionic paper-sizing agents based on mixtures of copolymer salts containing succinic acid imide units and polymer latices which need themselves show hardly any sizing effect.

Our Belgian patent specification No. 728,763 relates to anionic sizing agents, which can be used at the pulp stage, but more particularly during surface sizing, producing an adequate sizing effect both in neutral and also in alkaline aqueous medium. The sizing agents in question are anionic sizing agents of water-soluble reaction products of (A) Copolymers containing
    30 to 70 mol percent of copolymerised units of olefinically unsaturated monomers, and
    70 to 30 mol percent of succinic acid imide units corresponding to the formula:

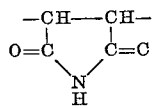

with
(B) 0.4 to 100 equivalents of ammonia or of an aliphatic or cycloaliphatic amine, alkali metal hydroxide, alkali metal carbonate or alkali metal bicarbonate or mixtures thereof, the equivalents being based on one imide group in the copolymer (A).

Although these anionic sizing agents are very effective, they do have on disadvantage, which seriously restricts their serviceability. They have relatively high viscosities so that only in dilute form, i.e. in concentrations of less than 20% by weight, are they so thinly liquid that they can be readily further diluted to serviceable concentrations. In addition, they also tend to gel at room temperature in concentrations in excess of 20% by weight, making them difficult to handle. In practice, it is only possible to transport dilute solutions, which calls for uneconomically elaborate transportation facilities and storage space.

The object of the present invention is to modify the anionic sizing agents referred to above in such a way, without any reduction in their sizing effect per concentration unit, preferably in concentrations in excess of 20% by weight in aqueous solution, that the products obtained are so thinly liquid that they can be effectively diluted with more water at room temperature.

According to the invention, this object can be achieved by initially preparing a polymer latex with a solids content of from 5 to 50% by weight, preferably from 15 to 35% by weight, by methods known per se, using the usual anionic emulsifiers such as aryl or alkyl sulphonates or sulphates, or fatty acid salts, or using non-ionic emulsifiers such as ethylene oxide addition or alkylene oxide addition products with fatty alcohols, or alkyl phenols, etc., or using the sizing agents themselves (for example in accordance with Belgian patent specification No. 728,763) which also have an emulsifying effect, and mixing the latex thus prepared which, on its own, only shows or only needs to show a weak, usually inadequate sizing effect, with the aforementioned sizing agent in a weight ratio of from 1:15 to 15:1, preferably in a weight ratio of from 2:1 to 1:2.

The latex thus prepared acts as a diluent for the sizing agent whose viscosity is too high for satisfactory application, and makes it easy to handle. Surprisingly, the thus modified sizing agent does not show any reduction in its sizing effect in comparison with a pure, undiluted sizing agent, having the same solids content, although the modified sizing agent would be expected to show a weaker sizing effect in view of its lower active-size content. This result is also particularly surprising because the copolymers used for modification (dilution) exhibit hardly any sizing activity as demonstrated, for example, by an ink floating time test.

When the pure sizing agent is used as emulsifier in the production of the polymer latex, it is, of course, also possible to use it from the outset in such a quantity that there is no need for the polymer latex to be subsequently mixed with more pure sizing agent, because it is, of course, already present in suitable quantities in the latex thus prepared.

It has also been found that some of the cyclic imide groups derived from succinic acid or maleic acid present by definition in the originally mentioned, pure anionic sizing agent, can also be replaced by carboxy groups or alkali or ammonium salts thereof or carbamoyl-carboxy groups or salts thereof of the corresponding dicarboxylic acid. This is the case, for example, when, starting from maleic acid anhydride or maleic acid half ester polymers, imide formation is carried out using a less than stoichiometric quantity of ammonia.

It is, however, necessary for the activity of the product for most, i.e. more than 50% by weight, of the dicarboxylic acid units to be present in the imide form.

Accordingly, the present invention relates to modified anionic sizing agents based on copolymers containing succinic acid imide groups, which comprise mixtures of:

(I) from 5 to 50% by weight aqueous solution of a water-soluble reaction product of
    (A) a copolymer containing
        30 to 70 percent of copolymerised units of olefinically unsaturated monomers, and
        70 to 30 mol percent of copolymerised units of maleic acid imide or itaconic acid imide, and from 0 to 50% by weight of these imide units being replaceable by carboxy or carboxy-carbamoyl groups or salts thereof, with
    (B) 0.4 to 100 equivalents per imide group in copolymer (A) of ammonia, of an aliphatic or cycloaliphatic amine, an alkali metal carbonate or alkali metal bicarbonate or mixtures thereof, preferably ammonia, and
(II) from 5 to 50% by weight latex of a copolymer of olefinically unsaturated monomers, the weight ratio of mixtures I and II being from 1:15 to 15:1.

The solution I preferably has a concentration of from 10 to 30% by weight, whilst the latex II preferably has a concentration of from 15 to 35% by weight.

The term "mixture" as used herein covers both physical and also chemical mixtures; in other words, if latex II is prepared from the corresponding monomers in the presence of the reaction product I, the monomers can be partly grafted on to the reaction product I.

The sizing agents according to the invention can be combined with conventional sizing agents, such as paraffins, fatty acid derivatives or resin sizes, and with other additives, such as optical brighteners, fillers, starch or pigments, and can be used at the pH values normally used in the production of paper.

Using the sizing agents according to the invention, anionic sizing can be successfully carried out in the pulp but, more particularly, on the surface of the paper, a remarkable sizing effect in alkaline aqueous medium being observed.

The copolymer (A) which is used as starting material for the non-modified sizing agents (intermediate=reaction product I as defined in claim 1), comprises 30 to 70 mol percent of units corresponding to the formulae:

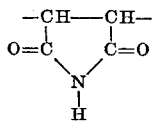

or

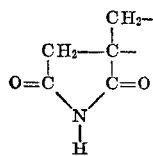

or of a major proportion of such units, and less than 50% of corresponding dicarboxylic acid or dicarboxylic acid half amide groups or corresponding salt groups, can be obtained, for example by copolymerising maleic acid imide with one or more olefinically unsaturated monomers, or by reacting the corresponding copolymers of the olefinically unsaturated monomers with anhydrides, half or full esters of α,β-unsaturated dicarboxylic acids with ammonia at elevated temperatures by known methods, for example in accordance with our Belgian patent specification No. 723,338, according to which a copolymer of olefinically unsaturated monomers with from 30 to 70 mol percent of the anhydride and/or half ester and/or full ester of an α,β-unsaturated dicarboxylic acid are reacted in aqueous medium at a temperature above 120° C., with approximately 0.5 to 2.5 mols of ammonia per mol of dicarboxylic acid group present in the polymer.

In addition to 70 to 30 mol percent of olefinically unsaturated monomers, the copolymers to be used should contain 30 to 70 mol percent of the anhydride and/or half ester and/or full ester of an α,β-unsaturated dicarboxylic acid incorporated in them. Itaconic acid, maleic acid or fumaric acid, and mixtures thereof, are preferably used as the α,β-unsaturated dicarboxylic acids. Maleic acid anhydride has the greatest interest. Esterification components include, in particular, alcohols with 1 to 20 carbon atoms, preferably monohydric alcohols with 1 to 12 carbon atoms, for example methanol, ethanol, isopropanol, n-butanol, cyclohexanol or n-dodecanol.

Suitable olefinically unsaturated monomers include any monomers which can be copolymerised with maleic acid anhydride, although it is preferred to use monoolefinically unsaturated hydrocarbons with 2 to 12 carbon atoms, for example ethylene, isobutylene, styrene, diisobutylene, dicyclopentadiene, α-methyl styrene, indene and mixtures thereof.

Copolymers having a substantially alternating structure comprising these olefinically unsaturated monomers with an equimolar amount of maleic acid hydride or a maleic acid half ester, which can be obtained by conventional processes, are used with particular success, although it is preferred to use a substantially alternating copolymer of styrene with maleic acid anhydride or a maleic acid half ester, for example a copolymer of styrene with monoisopropyl maleate.

To prepare the reaction product I, the aforementioned copolymer (A) with the cyclic carboxylic acid imide groups is reacted with ammonia and/or an aliphatic amine with 1 to 24, preferably with 1 to 12, carbon atoms and/or a cycloaliphatic amine with 5 to 7 carbon atoms, and/or an alkali, and converted into aqueous solution. Ammonia is preferably used for this reaction.

The copolymer is reacted in the presence of water with ammonia and/or with the amine and/or with the alkali, preferably with ammonia. The ammonia and/or the amine and/or the alkali can be used either in pure form or in the form of an aqueous solution or mixture.

The amine can be primary, secondary or tertiary. The following are mentioned by way of example: methylamine, dimethylamine or trimethylamine; the corresponding ethylamines, propylamines or butylamines; cyclohexylamine; methyl hexylamine; dodecylamine; and stearylamine.

Polyamines such as ethylene diamine, di- or tetramethyl ethylene diamine or ethanol diamine, diethanolamine, triethanolamine, and methyl ethanolamine, are also suitable.

In addition to ammonia, volatile amines with boiling points below 100° C., such as methylamine, dimethylamine, trimethylamine and the corresponding ethylamines, n-propylamine, isopropylamine or n-butylamine, sec-butylamine or tertbutylamine, are particularly suitable.

For physiological reasons, however, it is preferred to use less volatile amines, such as ethanolamine or triethanolamine, in addition to ammonia which is readily volatile. The quantity of alkali, ammonia or amine used for the reaction should be at least 0.4 for example from 0.4 to 100 equivalents of basic nitrogen or alkali per imide group present in the copolymer, 0.6 to 30 equivalents being preferred. When ammonia is used in dilute solution, it is possible for the maximum figure quoted to be exceeded, because of the high solubility of ammonia in water, without in any way impairing the effectiveness of the process.

The alkali metal and/or ammonia and/or amine is best used in such a quantity that the copolymer to be reacted is dissolved.

The reaction is preferably carried out at a temperature of from 0 to 120° C., especially at a temperature of from 15 to 90° C., and, in most instances, at a temperature of from 45 to 80° C. Although higher temperatures are possible, they are likely to produce a drop in activity because of secondary reactions.

In one preferred embodiment, aqueous alkali or gaseous ammonia, or the amine, is gradually added to the aqueous suspension or dispersion, or to the latex of the copolymer according to our Belgian patent specification No. 723,338 with the recurring units:

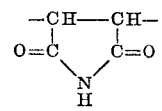

or

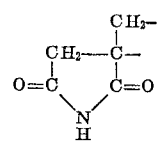

from 0 to 50% by weight of these imide units optionally being replaceable by dicarboxylic acid or dicarboxylic acid half amide groups or corresponding salt groups, which already contain the requisite quantity of water, until solution occurs at the reaction temperature selected. If necessary, the reaction mixture can then be stirred for a while or an excess of ammonia or amine can be added. The solution formed is then ready for use as the reaction product I, optionally after dilution to a required concentration.

The quantity of water used during the reaction is most advantageously so adjusted that the accumulating solution of the reaction product I (intermediate) has a solids content of from 5 to 50% by weight, preferably from 10 to 30% by weight.

According to the invention, a polymer emulsion which can be used as a sizing agent, either directly or after it has been mixed with more intermediate, is now prepared in the presence of the thus obtained water-soluble reaction product I (=intermediate=non-modified sizing agent), which is soluble in water or at least colloidally dispersed in the aqueous phase, by radical polymerisation with the olefinically unsaturated monomers.

The reaction product I acts as emulsifier or dispersant in this emulsion polymerisation reaction, which is carried out in the usual way.

It is also possible, however, to prepare the latex II by conventional methods using the usual anionic or non-ionic emulsifiers and subsequently to mix it with reaction product I. Emulsifiers of this kind include aryl or alkyl sulphonates or even alkyl or aralkyl sulphonates, fatty acid salts, addition products of ethylene oxide with alkyl phenols, fatty acids or fatty alcohols, or polymers known to behave as emulsifiers, for example partly hydrolysed polyvinyl acetate, starch or cellulose derivatives. The usual emulsifiers are preferably used in quantities of less than 6% by weight, based on the monomer total. When reaction product I is used as the emulsifier, however, it can be employed in a quantity of from 3 to 200% by weight, preferably in a quantity of from 6 to 100% by weight, based on total monomer.

Olefinically unsaturated monomers suitable for use in the preparation of copolymer latex II include aromatic vinyl or vinylidene compounds such as styrene or nuclear- or side-chain-substituted styrenes, such as p-methyl styrene, $\alpha$-methyl styrene, or p-isopropyl styrene; vinyl esters such as vinyl acetate or vinyl propionate; vinyl ethers such as vinyl isobutyl ether; vinyl or vinylidene halides such as vinyl chloride; vinylidene chloride; vinyl amides such as vinyl pyrrolidone; acrylic acid, methacrylic acid and their substituted or unsubstituted amides, for example N-methylol amides or N-methylol alkyl ether amides; olefins such as ethylene; butadiene; and esters of maleic acid, fumaric acid or itaconic acid; although it is preferred to use (meth)acrylonitrile and esters of (meth)acrylic acid with alcohols containing 1 to 18, and preferably 2 to 8, carbon atoms, such as ethyl (meth)acrylate, butyl (meth)acrylate or isooctoyl (meth)acrylate. Combinations of different monomers are also suitable, combinations of acrylonitrile with (meth)acrylic acid esters such as butyl (meth)acrylate being preferred.

The emulsion polymerisation reaction is carried out with the usual radical formers, preferably with redox systems such as persulphate/triethanolamine, or cumene hydroperoxide/formaldehyde sulphoxylate/Fe, at a temperature of from 10 to 90° C. The latex formed should have a solids content of from 5 to 50% by weight, preferably from 15 to 35% by weight.

The resulting latex II can be mixed with the reaction product I in a weight ratio of 1:15 to 15:1, preferably in a weight ratio of 1:2 to 3:1. Although not absolutely necessary, polymer latex II and reaction product I preferably have the same concentration so that the sizing agent according to the invention prepared by mixing them at a temperature of from room temperature to 80° C., preferably from room temperature to 50° C., has a solids concentration of preferably from 15 to 35% by weight.

When the intermediate is used as emulsifier in the preparation of the polymer latex, it is, of course, also possible from the outset to use the intermediate in such a quantity, exceeding the quantity in which the emulsifier is normally used, that there is no need for the resulting polymer latex to be subsequently mixed with more intermediate, because a suitable quantity is, of course, already present in the latex thus prepared.

The parts and percentages quoted below are by weight unless otherwise stated. n-Values are measured in dimethyl formamide (DMF) at 25° C.

Non-modified sizing agent 1=intermediate 1

156 parts of a substantially alternating, equimolar copolymer of maleic acid anhydride and isobutylene or 190 parts of the methyl half ester of this polymer with an $\eta$ value of approximately 0.5 are introduced into 350 parts of water. 35 parts of ammonia are then introduced under pressure into the autoclave used, followed by heating for 10 hours at 170° C. The resulting suspension of the imide is then cooled to approximately 70° C., after which another 10 to 15 parts of ammonia are introduced under pressure, followed by stirring for 1 hour at 70° C. A hazy paste with a solids content of approximately 33% is obtained, solidifying into a gel on cooling. It can only be diluted with hot water to a solids content of 14%, resulting in the formation of a slightly hazy solution which does not gel. This solution is used as intermediate 1.

Non-modified sizing agent 2=intermediate 2

1000 parts of a predominantly alternating, equimolar styrene/maleic acid anhydride copolymer are stirred for 8 hours at 170° C. with 2500 parts of water and 500 parts of concentrated aqueous ammonia. An approximately 25% latex of the corresponding polymeric imide is formed. Ammonia is then introduced into 100 parts of the undiluted latex at 55° C. until a viscous solution with a solids content of approximately 25% is formed. This solution, which tends to gel at room temperature, can be diluted with warm water to a solids content of 15% and is only thinly liquid in this form.

Non-modified sizing agent 3=intermediate 3

1200 parts of maleic acid anhydride and 1100 parts of isopropanol are heated to 120° C. in an autoclave. A solution of 12 parts of tert-butyl hydroperoxide, 100 parts of isopropanol and 1200 parts of styrene is then introduced under pressure at a temperature of 120° C. This is followed by stirring for 1 hour at 120° C. and at 150° C. A mixture of 2400 parts of water and 1200 parts of 23% aqueous ammonia is then introduced under pressure into the half ester polymer formed in this way, followed by heating for 10 hours at 150° C., resulting in imide formation. A viscous paste is formed, whose solids content is adjusted to 28% by stirring with 23% aqueous ammonia. The highly viscous, hazy solution thus formed can be further diluted with warm water.

Non-modified sizing agent 4=intermediate 4

The method is the same as that employed to produce intermediate 3, except that after the 10 hours heating at 150° C. the product is cooled to 70° C. A solution of 900 parts of triethanolamine in 1300 parts of water is then introduced under pressure, followed by stirring for 1 hour at 70° C. A hazy paste with a solids content of approximately 40% is formed. It can only be diluted with water when heated.

Non-modified sizing agent 5=intermediate 5

2400 parts of maleic acid anhydride and 2200 parts of isopropanol are heated to 120° C. in an autoclave. A solution of 24 parts of tert-butyl hydroperoxide in 200 parts of isopropanol and 2400 parts of styrene is then pumped in. This is followed by stirring for 1 hour at 150° C., after which a solution of 1900 parts of 24% aqueous ammonia in 5100 parts of water is introduced under pressure and the temperature is kept for 6 hours at 170° C. The temperature is then reduced to 70° C., followed by the addition of a mixture of 4000 parts of concentrated aqueous ammonia and 20,000 parts of water. After stirring for 1 hour, a thinly liquid, substantially clear solution with a solids content of approximately 14% is obtained. If a sample is carefully evaporated to dryness, the solid product shows the imide double band in the infra-red spectrum characteristic of cyclic imides at approximately 1770 cm.$^{-1}$ and approximately 1705 cm.$^{-1}$.

Modified sizing agent 1

2450 parts of intermediate 1 are heated to 45° C. in a flask. The following are then simultaneously introduced dropwise over a period of 1 hour: a mixture of 200 parts of acrylonitrile, 100 parts of styrene, 400 parts of butyl acrylate and 7.5 parts of cumene hydroperoxide and a solution of 3.8 parts of sodium formaldehyde sulphoxylate in 170 parts of water.

Polymerisation is complete 1 hour after the dropwise addition, resulting in the formation of a latex with a solids content of approximately 32% by weight. This latex can now be used as sizing agent and, unlike a solution of the intermediate having the same concentration, is free-flowing and can be diluted without difficulty.

Modified sizing agent 2

25,000 parts of intermediate 2 diluted to 15% are heated to 50° C. in an autoclave. This is followed by the addition of 2100 parts of acrylonitrile, 4900 parts of butyl acrylate, 1750 parts of water and 100 parts of ammonium persulphate. Polymerisation is carried out under nitrogen at a temperature of 50° C., and is complete after 3 hours. A latex with a solids content of approximately 31% is formed. Unlike a comparable 30% solution of the intermediate, this latex is free-flowing and can be diluted without difficulty. It has substantially the same sizing effect as a solution of the intermediate having the same solids content.

Modified sizing agent 3

The following are introduced under nitrogen into a flask: 800 parts of water, 60 parts of intermediate 3 (28%), 0.8 part of triethanolamine, 100 parts of butyl acrylate and 50 parts of acrylonitrile. The polymerisation mixture is activated with 1.5 parts of ammonium sulphate and polymerisation continued with stirring at 45° C., resulting in the formation of a latex with a solids content of approximately 15%. This thinly liquid latex is suitable as such for use as a sizing agent. It is, however, mixed with more of the intermediate 3 (28%) in a weight ratio of 2:1, resulting in the formation of a free-flowing, non-gelling latex which can readily be diluted with water and which is used as sizing agent.

Modified sizing agent 4

125 parts of intermediate 4 (expressed as solid substance), 750 parts of water, 112.5 parts of butyl acrylate, 52.5 parts of acrylonitrile and 1 part of ammonium persulphate, are introduced into an autoclave. Polymerisation is carried out with stirring for 1 hour at 45° C. in a nitrogen atmosphere, after which another 122.4 parts of butyl acrylate, 52.5 parts of acrylonitrile and 1 part of ammonium persulphate are added. Polymerisation is then carried out for another three hours at 45° C., resulting in the formation of a latex with a solids content of approximately 40% which is used as sizing agent.

Modified sizing agent 5

700 parts of the approximately 15% intermediate 5 and 3 parts of triethanolamine are introduced into an autoclave. The contents of the autoclave are then heated under nitrogen to a temperature of 45° C., after which the following two solutions are uniformly introduced over a period of 1 hour: solution A=100 parts of butyl acrylate and 100 parts of acrylonitrile; solution B=50 parts of water and 3 parts of ammonium persulphate. The mixture is stirred for 1 hour, giving an opaque latex with a solids content of approximately 32% which is used as a sizing agent.

The modified sizing agents 1 to 5 are free-flowing readily dilutable latices which are easy to handle when it comes to application and hence afford a technical advantage over the corresponding intermediates of the same concentration, especially because, in addition, their activity corresponds at least to that of the intermediates of the same concentration. This is further illustrated below:

Whereas heretofore the process has been discussed in reference to latices or mixtures thereof in which the intermediate itself acted as emulsifier, it is now intended to describe the mixing of sizing agent intermediate with latices prepared with conventional anionic and nonionic emulsifiers. These latices are mixed with intermediate 6. Whereas the pure latices have only an inadequate sizing effect, mixtures thereof with the intermediate have an outstanding sizing effect, i.e. mixing in no way impairs the sizing effect of the intermediate, but leads instead to the whole solids showing an outstanding sizing effect. In addition, the mixtures thus prepared are of low viscosity and easy to handle when it comes to application, which is not the case with the intermediate on its own.

Non-modified sizing agent 6=intermediate 6

3600 parts of maleic acid anhydride and 3300 parts of isopropanol are heated to 125° C. in an autoclave. A solution of 36 parts of tert-butyl hydroperoxide in 300 parts of isopropanol and 3600 parts of styrene is then pumped in over a period of about 2 hours. This is followed by stirring for 1 hour at 150° C., after which a solution of 1600 parts of approximately 25% aqueous ammonia in 7600 parts of water is introduced under pressure, followed by heating for 6 hours at 150° C. The product is then cooled to 70° C., diluted with a solution of 4500 parts of approximately 25% aqueous ammonia in 4500 parts of water and decanted, resulting in the formation of a viscous, slightly hazy solution. The solids content is found by concentration through evaporation to be from 27 to 30%, compared with a theoretical value of 26.5%. This material is used in the form of a 30% solution in all the following mixtures. The infra-red spectrum shows an imide double band as in intermediate 5.

Latex 1

A mixture of the following components is prepared under nitrogen in an autoclave equipped with stirring mechanism: 10,500 parts of water, 60 parts of paraffin sulphonate [commercial emulsifier Mersolat®], 25 parts of triethanolamine, 1350 parts of acrylonitrile, 3150 parts of butyl acrylate and 25 parts of ammonium sulphate. Polymerisation is continued at 45° C. until a latex with a solids content of 30% is formed.

Sizing agent 6

500 parts of latex 1 are stirred at 40° C., after which 500 parts of intermediate 6 are slowly poured in, followed by stirring for 30 minutes at 40° C. The product is then cooled and the mixture is optionally filtered through a cloth. The resulting 30% mixture, which can be diluted without difficulty, is ready for use as such.

Latex 2

The following components are introduced under nitrogen into a vessel equipped with stirring mechanism: 630 parts of water, 20 parts of approximately 25% aqueous ammonia, 3 parts of triethanolamine and, as emulsifier, 6 parts of an addition product of approximately 14 mols of ethylene oxide with oleyl alcohol. The mixture is heated to 50° C., after which a solution of 6 parts of the aforementioned emulsifier in 90 parts of acrylonitrile and 210 parts of butyl acrylate and a solution of 3 parts of ammonium persulphate in 50 parts of water are uniformly added dropwise over a period of about 70 minutes. A thinly liquid polymer latex with a solids content of approximately 30% by weight is formed.

Sizing agent 7

Latex 2 is mixed with intermediate 6 in the manner described for the preparation of sizing agent 6.

Latex 3

The following components are introduced into a vessel equipped with stirring mechanism: a solution of 20 parts of 24% aqueous ammonia, 1 part of oleic acid, 3 parts of triethanolamine and 6 parts of the emulsifier used in the preparation of latex 2 in 630 parts of water. A solution of 10 parts of oleic acid in 190 parts of butyl acrylate, 30 parts of acrylonitrile and 80 parts of styrene, and a solution of 3 parts of ammonium persulphate in 50 parts of water are then uniformly introduced over a period of 2 hours at 50° C., resulting in the formation of a thinly liquid approximately 30% latex.

Sizing agent 8

Latex 3 is mixed with intermediate 6 in the manner described for the preparation of sizing agent 6.

Latex 4

650 parts of water, 50 parts of concentrated aqueous ammonia solution, 3 parts of triethanolamine, 90 parts of acrylonitrile, 210 parts of butyl acrylate, 20 parts of lauric acid and 3 parts of potassium sulphate, are combined in a vessel equipped with stirring mechanism. Stirring is continued at 50° C. until an approximately 30% latex is formed.

Sizing agent 9

Latex 4 is mixed with intermediate 6 in the manner described for the preparation of sizing agent 6 at a mixing temperature of 25° C.

Latex 5

The procedure is the same as in the case of latex 4, except that a commercial fatty acid mixture, known as tall oil, whose main constituent is oleic acid, is used instead of lauric acid.

Sizing agent 10

Latex 5 is mixed with intermediate 6 in the manner described for the preparation of sizing agent 6.

Latex 6

The following components are combined in a vessel equipped with stirring mechanism: 650 parts of water, 50 parts of concentrated aqueous ammonia solution, 5 parts of triethanolamine, 150 parts of acrylonitrile, 150 parts of butyl acrylate, 30 parts of oleic acid and 3 parts of ammonium persulphate. This mixture is then stirred for 5 hours at 50° C., giving a glass-like latex with a solids content of approximately 30%.

Sizing agent 11

Latex 6 is mixed with intermediate 6 in the manner described for the preparation of sizing agent 6 at a temperature of 25° C.

Sizing agent 12

500 parts of intermediate 6 are stirred at 30° C. with 500 parts of a latex prepared in the absence of an emulsifier and comprising a copolymer of approximately 95% by weight of ethylene and approximately 5% of monocyclohexyl maleate (as the sodium salt), is prepared in an ethylene pressure apparatus with persulphate activation and which is adjusted to 30%.

A thinly liquid mixture which can be used as a sizing agent is formed.

Sizing agent 13

An approximately 30% latex of a butadiene (approximately 65%)/acrylonitrile (approximately 35%) copolymer is prepared by known methods (cf. Houben-Weyl, Methoden der Organischen Chemie, vol. 14/1, pages 674–733) and then mixed with intermediate 6 in a weight ratio of 1:1.

Sizing agent 14

The procedure is as for the sizing agent 13, except that an approximately 30% latex of a copolymer of approximately 70% butadiene and approximately 30% styrene is used. As in the case of sizing agent 13, the thinly liquid mixture formed also has a remarkable sizing effect. In other words, the water absorption of a paper treated with it is reduced to a far greater extent than when the pure latex is used.

EXAMPLE 1

A paper pulp suspension, consisting of 100 parts of bleached needle sulphite pulp ground to 45° SR in 20,000 parts of water, initially has 1 part of a standard commercial water-soluble condensation product of dicyandiamide with formaldehyde added to it in order to improve the retention of the sizing agent subsequently added. The pH value of the pulp suspension is then adjusted to 8.

2 parts (based on the solids content) of a sizing agent consisting of a mixture of 34% of intermediate 6 and 66% of latex 1 are then added and a paper with a surface weight of 80 g./sq. metre is formed in the usual way. After drying, a sizing value according to Cobb (wetting for 1 minute) of 35 g./sq. metre water absorption is obtained. A paper prepared in the same way but without the sizing agent has a Cobb value of approximately 180 g./sq. metre water absorption.

For Cobb-type sizing agents see "Pulp and Paper, Chemistry and Chemical Technology," Second edition, vol. 2, page 1036.

EXAMPLE 2

A non-sized paper with a surface weight of 80 g./sq. metre, prepared from 50 parts of bleached sulphite pulp, 50 parts of bleached sulphate pulp, ground to 40° SR, 15 parts of china clay and 3 parts of aluminum sulphate, is impregnated in a sizing press with a preparation having the composition set out below, in such a way that 1 part of paper absorbs 0.33 part of the preparation solution.

After the paper has been dried at 80 to 100° C., the folfollowing sizing values are obtained.

I. Sizing press preparation:
  10 g. of starch soluble in hot water,
  1 g. of sizing agents 1 to 5 (based on the solids content),
  89 g. of water.

II. Sizing values according to Cobb (wetting for 1 minute):

| Sizing agent added: | Water absorption in g./sq.m. |
|---|---|
| 1 | 20 |
| 2 | 20 |
| 3 | 18 |
| 4 | 19 |
| 5 | 17 |

By way of of comparison, water absorption values of 19 g. per sq. metre were obtained when the same quantity of intermediate 5 was used. It follows from this that the effect of the process, namely dilution of the intermediate for the sizing agent with a polymer latex, does not in any way impair the sizing effect.

EXAMPLE 3

A non-sized paper with a surface weight of 60 g./sq. metre, prepared from 30 parts of mechanical wood pulp, 70 parts of bleached sulphite pulp ground to 45° SR and 3 parts of aluminium sulphate solution is impregnated in a sizing press with a preparation solution having the composition set out below, in such a way that one part by weight of paper absorbs 0.33 part of the preparation solution.

After the paper has ben dried at 80 to 100° C., the following sizing values are obtained.

I. Sizing press preparation:
  6 g. of starch soluble in hot water,
  0.6 g. of sizing agent intermediate of latex (based on solids content) as identified below,
  03.4 of water.

II. Sizing values of the papers according to Cobb (wetting for 1 minute) and viscosities of the dispersions with solids content of 30%:

|  | Water absorption, g./sq. metre | Viscosity, in cp. at t=20° C. |
|---|---|---|
| Latex 1 | 24 | 7.8 |
| Mixture of 70% of latex 1 and 30% of intermediate 6 | 16 | 15.6 |
| Mixture of 50% latex 1 and 50% of intermediate 6 | 14.5 | 70 |
| Mixture of 30% latex 1 and 70% of intermediate 6 | 14.5 | 915 |
| Intermediate 6 | 14.5 | 4,040 |

As can be seen from these figures, intermediate 6 can be mixed in wide proportions with a latex which on its own has little or no sizing effect without appreciably affecting the sizing effect of the mixture. By contrast, the viscosity is reduced by addition of the thinly liquid latex and enables the product to be handled more easily.

EXAMPLE 4

A non-sized paper with a surface weight of 80 g./sq. metre, prepared from 50 parts of bleached sulphite pulp, 50 parts of bleached sulphate pulp ground to 40° SR, 15 parts of china clay and 3 parts of aluminium sulphate, is impregnated in a sizing press with a preparation having the composition shown below, in such a way that 1 part of paper absorbs 0.33 part of the preparation solution.

After the paper has been dried at 80 to 100° C., the following sizing values are obtained.

I. Sizing press preparation:
   10 g. of starch soluble in hot water,
   0.4 g. of sizing agents 6 to 11 or latices 1 to 6 or intermediate (based on the solids content),
   0.2 g. of optical brightener (No. 40622 in colour index II, edition 1956),
   89.4 g. of water.

II. Cobb sizing values (wetting for 1 minute):

| Sizing agent: | Water absorption in g./sq. metre |
|---|---|
| 6 | 25 |
| 7 | 22.5 |
| 8 | 24.5 |
| 9 | 25.5 |
| 10 | 23 |
| 11 | 22 |
| Latex: | |
| 1 | 36 |
| 2 | 34 |
| 3 | 33 |
| 4 | 31 |
| 5 | 32 |
| 6 | 31 |
| Intermediate 6 | 22.5 |

The sizing values show that by mixing intermediate 6 with latices 1 to 6 it is possible to obtain sizing agents which are substantially equivalent in their sizing effect to the pure intermediate.

EXAMPLE 5

A non-sized paper with a surface weight of 80 g./sq. metre, prepared from 50 parts of bleached sulphite pulp, 50 parts of bleached sulphate pulp ground to 40° SR, 15 parts of china clay and 3 parts of aluminium sulphate is impregnated in a sizing press with a preparation having the composition set out below in such a way that 1 part of paper absorbs 0.6 part of the preparation solution. After the paper has been dried at 80 to 100° C., the following sizing values are obtained.

I. Sizing press preparation:
   0.4 g. of sizing agent 12 to 14 and 0.2 g. of intermediate 6,
   99.6 g. and 99.8 g. of water.

II. Cobb sizing values (wetting for 1 minute):

| | Water absorption in g./sq. metre |
|---|---|
| With half the quantity of intermediate 6 | 21 |
| Sizing agent: | |
| 12 | 20 |
| 13 | 22 |
| 14 | 20 |
| Latex: | |
| Ethylene-monocyclohexyl maleate described in reference to sizing agent 12 | 26 |
| Butadiene-acrylonitrile described in reference to sizing agent 13 | 36 |
| Butadiene-styrene described in reference to sizing agent 14 | 39 |

As the sizing values obtained show, a variety of different types of polymer latices are suitable for producing sizing agents in accordance with the invention which are easy to handle when it comes to application and which have good sizing values when combined with an intermediate of the kind described above which, on its own, is too viscous.

We claim:
1. A modified anionic sizing agent which comprises a mixture of:
   (I) from 5 to 50% by weight of an aqueous solution of a water soluble reaction product of
      (A) a copolymer containing 30 to 70 mol percent of copolymerised units of styrene or isobutylene and 70 to 30 mol percent of copolymerised units of maleic acid imide, from 0 to 50% by weight of these imide units being replaceable by carboxy or carboxy-carbamoyl groups or alkali metal or ammonium salts thereof, with
      (B) 0.4 to 100 equivalents per imide group in copolymer A of ammonia, and
   (II) from 5 to 50% by weight of a latex of a copolymer of acrylonitrile or methacrylonitrile with an ester of acrylic acid or methacrylic acid having 2 to 8 carbon atoms in the alcohol moiety,
the weight ratio of mixtures I and II being from 1:15 to 15:1.

2. A paper sizing agent as claimed in claim 1 wherein copolymer (A) has a substantially equimolar, alternating structure.

3. The modified anionic sizing agent of claim 1 wherein the copolymer of the latex of II includes copolymerized styrene.

4. The modified anionic sizing agent of claim 1 wherein the weight ratio of mixture I and II is 1:2 to 3:1.

References Cited
FOREIGN PATENTS

| 723,338 | 4/1969 | Belgium. |
| 1,720,746 | 7/1971 | Germany. |
| 728,763 | 8/1969 | Belgium. |

MELVIN GOLDSTEIN, Primary Examiner

U.S. Cl. X.R.

162—168, 169; 260—29.6 WB